United States Patent
Okubo et al.

(10) Patent No.: US 12,481,260 B2
(45) Date of Patent: Nov. 25, 2025

(54) SERVER AND POWER CONDITIONING SYSTEM

(71) Applicant: TOYOTA JIDOSHA KABUSHIKI KAISHA, Toyota (JP)

(72) Inventors: Atsushi Okubo, Nisshin (JP); Kiyonori Yoshida, Toyota (JP); Kotomi Asano, Toyota (JP); Tamaki Ozawa, Toyota (JP); Yusuke Saigo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 383 days.

(21) Appl. No.: 18/143,872

(22) Filed: May 5, 2023

(65) Prior Publication Data
US 2024/0012377 A1 Jan. 11, 2024

(30) Foreign Application Priority Data
Jul. 5, 2022 (JP) .................. 2022-108310

(51) Int. Cl.
G05B 19/042 (2006.01)
(52) U.S. Cl.
CPC .... G05B 19/042 (2013.01); *G05B 2219/2639* (2013.01)
(58) Field of Classification Search
CPC .......... G05B 19/042; G05B 2219/2639; G06Q 10/06; G06Q 50/06; G06Q 10/06315; Y02T 10/70; Y02T 10/7072; Y02T 90/12; Y02T 90/16; B60L 53/60; H02J 3/00;
(Continued)

(56) References Cited

U.S. PATENT DOCUMENTS

2016/0126732 A1* 5/2016 Uyeki ............... H02J 13/00001
700/295
2019/0184938 A1* 6/2019 Hioki ................... G05D 1/0088
(Continued)

FOREIGN PATENT DOCUMENTS

JP 2018-045469 A 3/2018

OTHER PUBLICATIONS

E. Biswas, et al., "State-of-the-Art Review on Recent Advancements on Lateral Control of Autonomous Vehicles", IEEE Access (vol. 10, 2022, pp. 114759-114786) Jan. 2022. (Year: 2022).*

*Primary Examiner* — Amber A Misiaszek
(74) *Attorney, Agent, or Firm* — Dinsmore & Shohl LLP

(57) ABSTRACT

A server includes a storage device, a communication device, and a processing device. The storage device stores DR location information and DR period information. The communication device is configured to communicate with a provider server that stores a database indicating an available period and a use start location of each of a plurality of managed mobile objects. The processing device is configured to perform a process of inquiring the provider server about whether the managed mobile objects include a target mobile object of which the available period is in the DR period and the use start location is in a vicinity area of the DR location. When the managed mobile objects include the target mobile object, the processing device is configured to perform a notification process of notifying the user of target mobile object information indicating the available period and the use start location of the target mobile object.

7 Claims, 11 Drawing Sheets

(58) Field of Classification Search
CPC ............... H02J 3/322; H02J 13/00001; H02J 13/00002; H02J 13/00032; H02J 2203/10
See application file for complete search history.

(56) References Cited

U.S. PATENT DOCUMENTS

| | | | |
|---|---|---|---|
| 2021/0024103 A1* | 1/2021 | Hara | G06Q 50/40 |
| 2023/0131063 A1* | 4/2023 | Cun | G06Q 50/06 |
| | | | 705/7.15 |

* cited by examiner

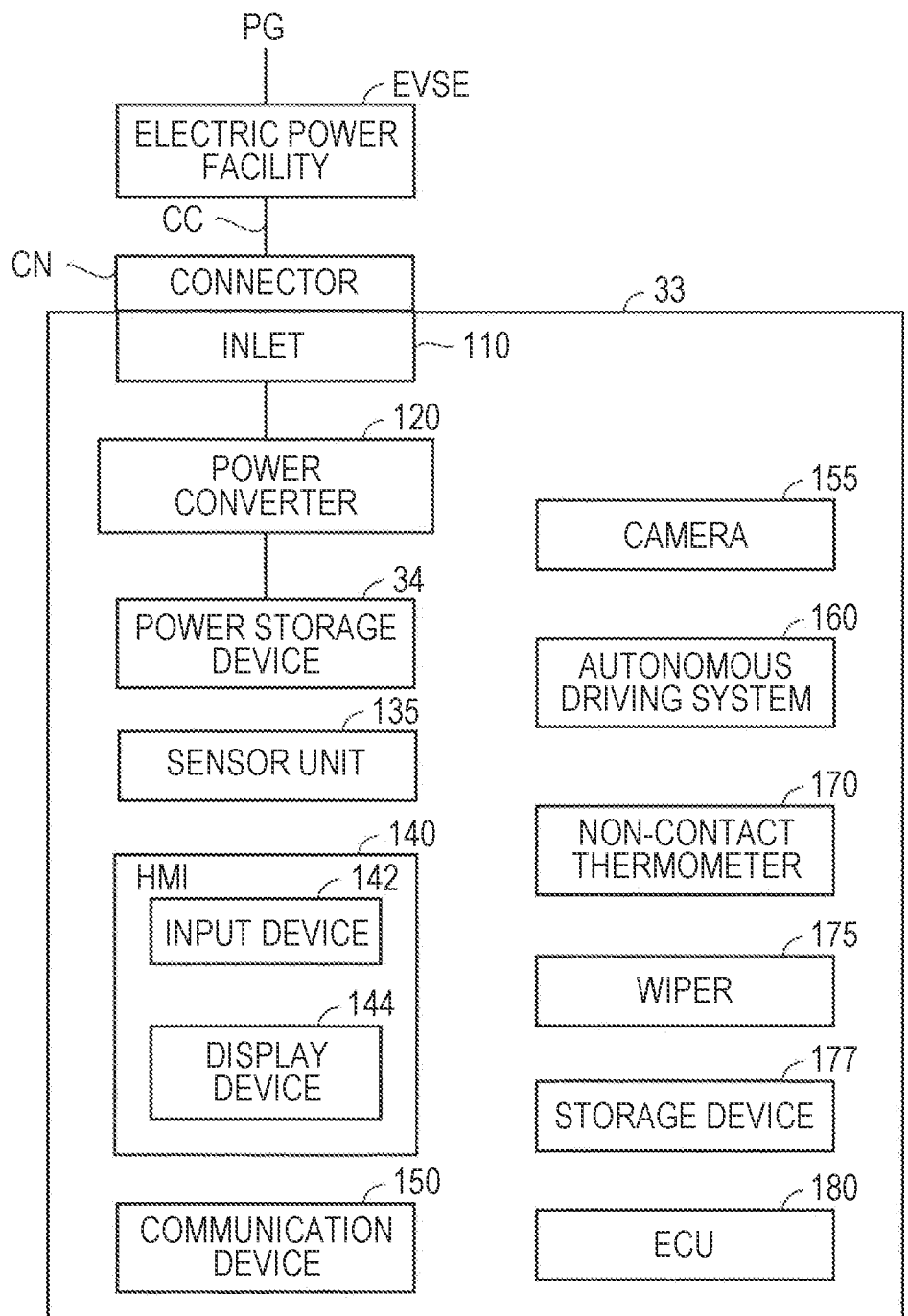

FIG. 4

| | ID INFORMATION 521 | TYPE INFORMATION 522 | OCCUPANT NUMBER INFORMATION 523 | OPERATION REQUIREMENT INFORMATION 524 | ROOFED/ NON-ROOFED INFORMATION 525 | RETURN REQUIREMENT INFORMATION 526 | AVAILABLE PERIOD INFORMATION 527 | USE START LOCATION INFORMATION 528 |
|---|---|---|---|---|---|---|---|---|
| (55A) | 001A | RENTED VEHICLE | TWO OR MORE PERSONS | NON-REQUIRED | WITH ROOF | REQUIRED | ts1a~tf1a | P1 |
| (55B) | 002A | RENTED VEHICLE | TWO OR MORE PERSONS | NON-REQUIRED | WITH ROOF | REQUIRED | ts2a~tf2a | P11 |
| (55C) | 003A | RENTED VEHICLE | TWO OR MORE PERSONS | NON-REQUIRED | WITHOUT ROOF | REQUIRED | ts3a~tf3a | P21 |
| | ... | ... | ... | ... | ... | ... | ... | ... |
| (65A) | 001B | RENTED BICYCLE | ONE PERSON | REQUIRED | WITHOUT ROOF | REQUIRED | ts1b~tf1b | P2 |
| (65B) | 002B | RENTED BICYCLE | ONE PERSON | REQUIRED | WITHOUT ROOF | REQUIRED | ts2b~tf2b | P21 |
| (65C) | 003B | RENTED BICYCLE | ONE PERSON | REQUIRED | WITHOUT ROOF | REQUIRED | ts3b~tf3b | P22 |
| | ... | ... | ... | ... | ... | ... | ... | ... |
| (75A) | 001C | BUS | TWO OR MORE PERSONS | NON-REQUIRED | WITH ROOF | NON-REQUIRED | ts1c~tf1c | P3 |
| (75B) | 002C | BUS | TWO OR MORE PERSONS | NON-REQUIRED | WITH ROOF | NON-REQUIRED | ts2c~tf1c | P13 |
| (75C) | 003C | BUS | TWO OR MORE PERSONS | NON-REQUIRED | WITH ROOF | NON-REQUIRED | ts3c~tf1c | P23 |
| | ... | ... | ... | ... | ... | ... | ... | ... |

52, 520

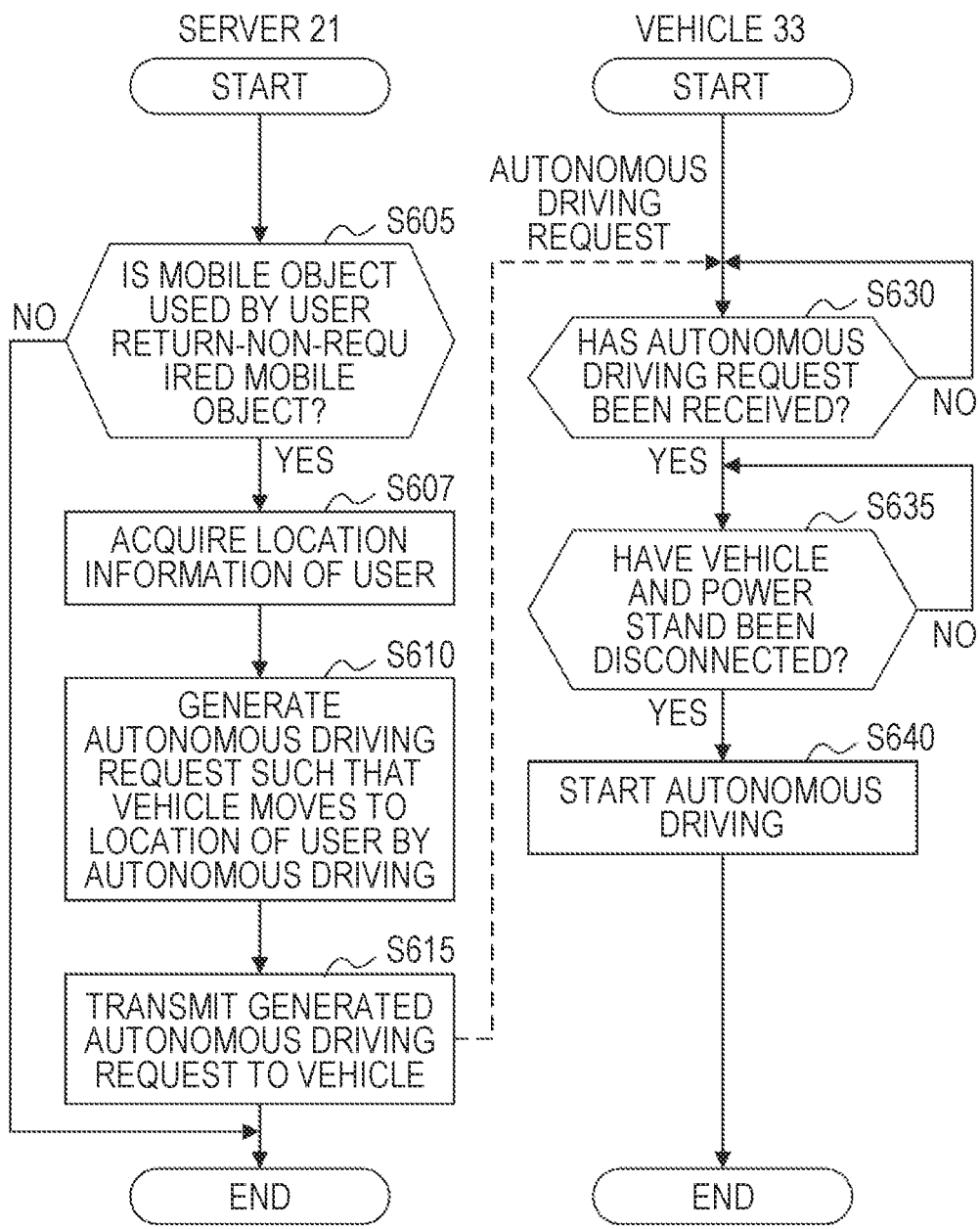

SERVER AND POWER CONDITIONING SYSTEM

CROSS-REFERENCE TO RELATED APPLICATION

This application claims priority to Japanese Patent Application No. 2022-108310 filed on Jul. 5, 2022, incorporated herein by reference in its entirety.

BACKGROUND

1. Technical Field

The present disclosure relates to a server and a power conditioning system.

2. Description of Related Art

Japanese Patent Application Publication No. 2018-45469 (JP 2018-45469 A) discloses a vehicle allocation device. The vehicle allocation device includes a delivery means, a participation application collecting means, and a vehicle allocating means. The delivery means delivers event information indicating at least a date and time and a location of an event to a user terminal. The participation application collecting means receives participation application information indicating an intention for participation in an event from the user terminal. The vehicle allocating means allocates vehicles based on the participation application information received by the participation application collecting means.

SUMMARY

Demand response (DR) for adjusting electric power demand-supply balance in a power grid has been studied in association with a virtual power plant (VPP). DR is a technique of requiring power-conditioning resources of consumers to change (for example, increase) demand for electric power.

When a vehicle in which a power storage device is mounted is used as a power-conditioning resource of DR, the vehicle may participate in the DR through external charging of charging the onboard power storage device using an electric power facility outside of the vehicle. The vehicle is connected to the electric power facility in a period in which the vehicle participates in the DR (DR period). Accordingly, a user of the vehicle cannot move from a DR location (a location at which the vehicle participates in the DR) by driving the vehicle in the DR period. As a result, convenience for a user's movement is likely to decrease. Such a problem has not been mentioned in JP 2018-45469 A.

The present disclosure provides a server and a power conditioning system that can improve convenience for a user's movement in a DR period while contributing to adjustment of electric power demand-supply balance.

According to an aspect of the present disclosure, there is provided a server configured to notify a user of a vehicle. The vehicle is able to participate in demand response (DR) for adjusting electric power demand-supply balance in a power grid through external charging of charging an onboard power storage device using an electric power facility outside of the vehicle. The server includes a storage device, a communication device, and a processing device. The storage device is configured to store information indicating a DR period which is a period in which the vehicle participates in the DR and a DR location which is a location of the electric power facility used for the vehicle to participate in the DR. The communication device is configured to communicate with a provider server that stores information indicating an available period and a use start location of each of a plurality of managed mobile objects managed by a provider. The processing device is configured to perform a process of inquiring the provider server about whether the plurality of managed mobile objects includes a target mobile object of which the available period is in the DR period and the use start location is in a vicinity area of the DR location through the communication device. When the plurality of managed mobile objects includes the target mobile object, the processing device is configured to perform a notification process of notifying the user of target mobile object information indicating the available period and the use start location of the target mobile object.

With this configuration, a user can be motivated to use a target mobile object instead of the vehicle in the DR period. Accordingly, the user can efficiently move using the target mobile object even in the DR period. As a result, it is possible to improve convenience for a user's movement in a DR period while contributing to adjustment of electric power demand-supply balance.

The processing device may be configured to perform a process of acquiring a result of detection of a detection device that detects biological information of the user from the detection device. When a plurality of target mobile objects is present, the processing device may be configured to acquire the result of detection of the detection device, to perform a process of selecting a proposed mobile object which is proposed to the user out of the plurality of target mobile objects based on the result of detection, and to perform the notification process by notifying the user of the target mobile object information of the proposed mobile object.

With this configuration, a proposed mobile object is selected based on biological information. Accordingly, it is possible to propose a target mobile object suitable for health conditions of a user to the user.

The processing device may be configured to perform a process of acquiring a user image generated by an imaging device that images the user from the imaging device and to perform an attribute determining process of determining attributes of the user based on the user image. When a plurality of target mobile objects is present, the processing device may be configured to perform a process of selecting a proposed mobile object which is proposed to the user out of the plurality of target mobile objects based on a result of the attribute determining process and to perform the notification process by notifying the user of the target mobile object information of the proposed mobile object.

With this configuration, a proposed mobile object is selected based on attributes of a user. Accordingly, it is possible to propose a target mobile object suitable for attributes of the user to the user.

The managed mobile objects may be classified into a roofed mobile object and an unroofed mobile object. When a predetermined condition indicating bad weather in the DR period is satisfied, the processing device may be configured to perform the notification process by notifying the user of the target mobile object information of the roofed mobile object out of the plurality of target mobile objects.

With this configuration, a user can be motivated to use a roofed mobile object when the weather in the DR period is bad. Accordingly, the user can efficiently move while avoiding inconvenience due to bad weather in the DR period.

The processing device may be configured to perform a process of setting a command value of charging electric power of the onboard power storage device in the DR period and to perform a process of increasing the command value when a predetermined condition for returning to the DR location earlier than a scheduled end time of the DR period is satisfied after the user has started from the use start location using the target mobile object.

With this configuration, charging electric power increases when a predetermined condition for causing the user to return to the DR location earlier than the scheduled end time is satisfied. Accordingly, participation of the vehicle in the DR ends earlier than the scheduled end time. As a result, the user can avoid a situation in which the user waits unnecessarily up to the scheduled end time after the user has returned early to the DR location.

The vehicle may be configured to perform autonomous driving. The communication device may be configured to transmit an autonomous driving request for requesting the autonomous driving of the vehicle to the vehicle. The managed mobile objects may be classified into a return-required mobile object which is predetermined as a mobile object requiring return to the use start location after the user has used the mobile object and a return-non-required mobile object other than the return-required mobile object. When the target mobile object used by the user is the return-non-required mobile object, the processing device may be configured to perform a process of generating the autonomous driving request such that the vehicle moves to a location of the user through the autonomous driving after the DR period has expired.

A user does not need to return to the use start location after the user has used a return-non-required mobile object. With this configuration, an autonomous driving command is transmitted to the vehicle such that the vehicle moves to a location of the user through autonomous driving after the DR period has expired. Accordingly, the vehicle moves to the location of the user through autonomous driving after the DR period has expired. As a result, the user can restart driving of the vehicle after the DR period has expired without returning to the DR location.

According to another aspect of the present disclosure, there is provided a power conditioning system including a server and a vehicle. The server is configured to notify a user of the vehicle. The vehicle is able to participate in demand response (DR) for adjusting electric power demand-supply balance in a power grid through external charging of charging an onboard power storage device using an electric power facility outside of the vehicle. The server includes a storage device, a communication device, and a processing device. The storage device is configured to store information indicating a DR period which is a period in which the vehicle participates in the DR and a DR location which is a location of the electric power facility used for the vehicle to participate in the DR. The communication device is configured to communicate with a provider server that stores information indicating an available period and a use start location of each of a plurality of managed mobile objects managed by a provider. The processing device is configured to perform a process of inquiring the provider server about whether the plurality of managed mobile objects includes a target mobile object of which the available period is in the DR period and the use start location is in a vicinity area of the DR location through the communication device. When the plurality of managed mobile objects includes the target mobile object, the processing device is configured to perform a notification process of notifying the user of target mobile object information indicating the available period and the use start location of the target mobile object.

According to the present disclosure, it is possible to improve convenience for a user's movement in a DR period while contributing to adjustment of electric power demand-supply balance.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a diagram illustrating a detailed configuration of a vehicle;

FIG. 4 is a diagram illustrating a database stored in a provider server;

FIG. 11 is a flowchart illustrating an example of a routine which is performed by a processing device of a server according to Modified Example 5.

DETAILED DESCRIPTION OF EMBODIMENTS

Figure 1:
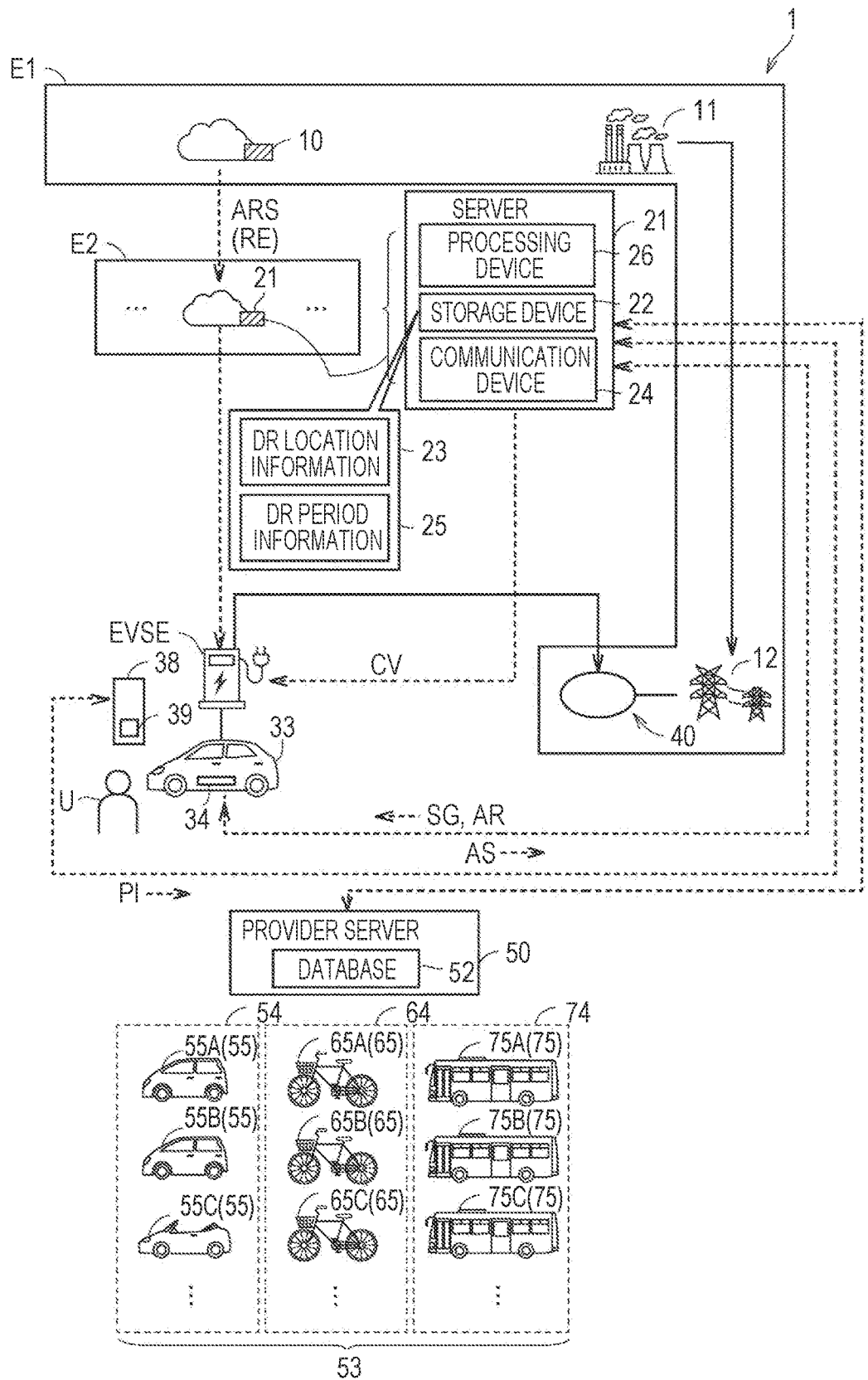
FIG. 1 is a diagram illustrating a configuration of a power conditioning system according to an embodiment.

An embodiment of the present disclosure will be described below in detail with reference to the accompanying drawings. The same or corresponding elements in the drawings will be referred to by the same reference signs and description thereof will not be repeated. In the following description, a vehicle that can perform external charging and autonomous driving is used as an example of a power resource.

FIG. 1 is a diagram illustrating a configuration of a power conditioning system according to an embodiment. Referring to FIG. 1, the power conditioning system 1 includes a power company system E1, an aggregation system E2, an electric power facility EVSE, a vehicle 33, a mobile terminal 38, and a provider server 50.

The power company system E1 is managed by a power company and includes a server 10, a power plant 11, a power transmission and distribution facility 12, and a power grid 40. The server 10 manages electric power demand-supply balance in the power grid 40. The power plant 11 supplies electric power generated by a power generator to the power transmission and distribution facility 12. The power transmission and distribution facility 12 supplies electric power supplied from the power plant 11 to the power grid 40.

The aggregation system E2 includes a server 21. The server 21 is managed by an aggregator and receives an adjustment request signal ARS from the power company system E1. The adjustment request signal ARS includes information indicating a power-conditioning period, a power-conditioning area, and an amount of conditioning-required electric power RE. The power-conditioning period and the power-conditioning area are a period and an area in which power conditioning is required. The amount of conditioning-required electric power is an amount of electric power of which conditioning (for example, increasing) is required in the power-conditioning area in the power-conditioning period.

The server 21 divides the amount of conditioning-required electric power RE into n amounts (n≥2) in response to reception of the adjustment request signal ARS. The server 21 allocates the n divided amounts of electric power to n power-conditioning resources. In this embodiment, the n power-conditioning resources include the vehicle 33 that can perform external charging and a plurality of other power-conditioning resources (not illustrated).

The server 21 requests the vehicle 33 to participate in DR by receiving an allocated amount of electric power (an allocated electric power) at the DR location in the DR period. Specifically, the server 21 transmits a signal SG to the vehicle 33 and requests the vehicle 33 to participate in DR using the signal SG. The server 21 may transmit the signal SG to a mobile terminal 38 of a user U of the vehicle 33 in order to request the vehicle 33 to participate in DR. The DR period corresponds to a power-conditioning period and is a period in which the vehicle 33 participates in DR in this example. The DR location is a location of the electric power facility EVSE used for the vehicle 33 to participate in DR in this example.

When the user U of the vehicle 33 approves participation in the DR, an approval signal AS indicating the approval is transmitted from the vehicle 33 (or the mobile terminal 38) to the server 21. As a result, a contract is made between the user U of the vehicle 33 and the aggregator.

The server 21 includes a storage device 22, a communication device 24, and a processing device 26. The storage device 22 includes a random access memory (RAM) and a read only memory (ROM) (none of which is illustrated). The RAM serves as a working memory. The ROM stores a program which is executed by the processing device 26 and data. The data includes DR location information 23 and DR period information 25. The DR location information 23 and the DR period information 25 include information indicating a DR location and a DR period for each power-conditioning resource.

The communication device 24 is configured to communicate with a device outside of the server 21. The device is, for example, the server 10, the vehicle 33, the mobile terminal 38, the electric power facility EVSE, or the provider server 50 (which will be described later). The communication device 24 is configured to transmit an autonomous driving request AR for requesting the vehicle 33 to perform autonomous driving (which will be described later) to the vehicle 33.

The processing device 26 includes a processor such as a central processing unit (CPU). For example, the processing device 26 is configured to perform a process of setting a command value CV for charging electric power of the power storage device 34 of the vehicle 33 (electric power supplied from the electric power facility EVSE to the power storage device 34) in the DR period. The processing device 26 transmits the command value CV to the electric power facility EVSE via the communication device 24.

The electric power facility EVSE is connected to the power grid 40 and is configured to supply electric power to the vehicle 33. The electric power facility EVSE is used for the vehicle 33 to participate in the DR. The electric power facility EVSE includes a communication device (not illustrated) and is configured to receive the command value CV from the server 21 via the communication device.

The vehicle 33 is an electric vehicle in which the power storage device 34 is mounted. The vehicle 33 is configured to participate in the DR by performing external charging using the electric power facility EVSE. The detailed configuration of the vehicle 33 will be described later.

The mobile terminal 38 is, for example, a smartphone, and is carried by a user U. The mobile terminal 38 includes a global positioning system (GPS) receiver 39. The GPS receiver 39 acquires position information PI of the mobile terminal 38. The position information PI is used as position information of the user U and is transmitted to, for example, the server 21.

The provider server 50 manages use (for example, reservation) of various types of managed mobile objects belonging to a mobile object group 53. Each managed mobile object is a mobile object different from the vehicle 33 and is a mobile object that is managed by a provider. The mobile object group 53 includes a rented vehicle group 54, a rented bicycle group 64, and a bus group 74.

The rented vehicle group 54 includes a plurality of rented vehicles 55 (for example, rented vehicles 55A to 55C). The rented vehicles 55A and 55B are roofed vehicles. The rented vehicle 55C is an unroofed vehicle (an open vehicle). The rented bicycle group 64 includes a plurality of rented bicycles 65 (for example, rented bicycles 65A to 65C). The bus group 74 includes a plurality of buses 75 (for example, buses 75A to 75C). Each bus 75 is a shuttle bus of which a destination is determined in advance.

The provider server 50 stores a database 52. The database 52 includes information indicating a use start location and an available period of each of the managed mobile objects belonging to the mobile object group 53 such as the rented vehicles 55, the rented bicycles 65, and the buses 75.

The use start location corresponds to, for example, a location of a parking lot in which the rented vehicles 55 are located, a bicycle parking lot in which the rented bicycles 65 are located, or a bus stop at which the buses 75 stop. For example, the available period of a rented vehicle 55 or a rented bicycle 65 is a time zone in which the corresponding managed mobile object is not reserved. The available period of a bus 75 is a period from a time point at which the bus 75 arrives at the bus stop to a time point at which the bus arrives at a destination. The database 52 may be accessed by the server 21.

Figure 2:
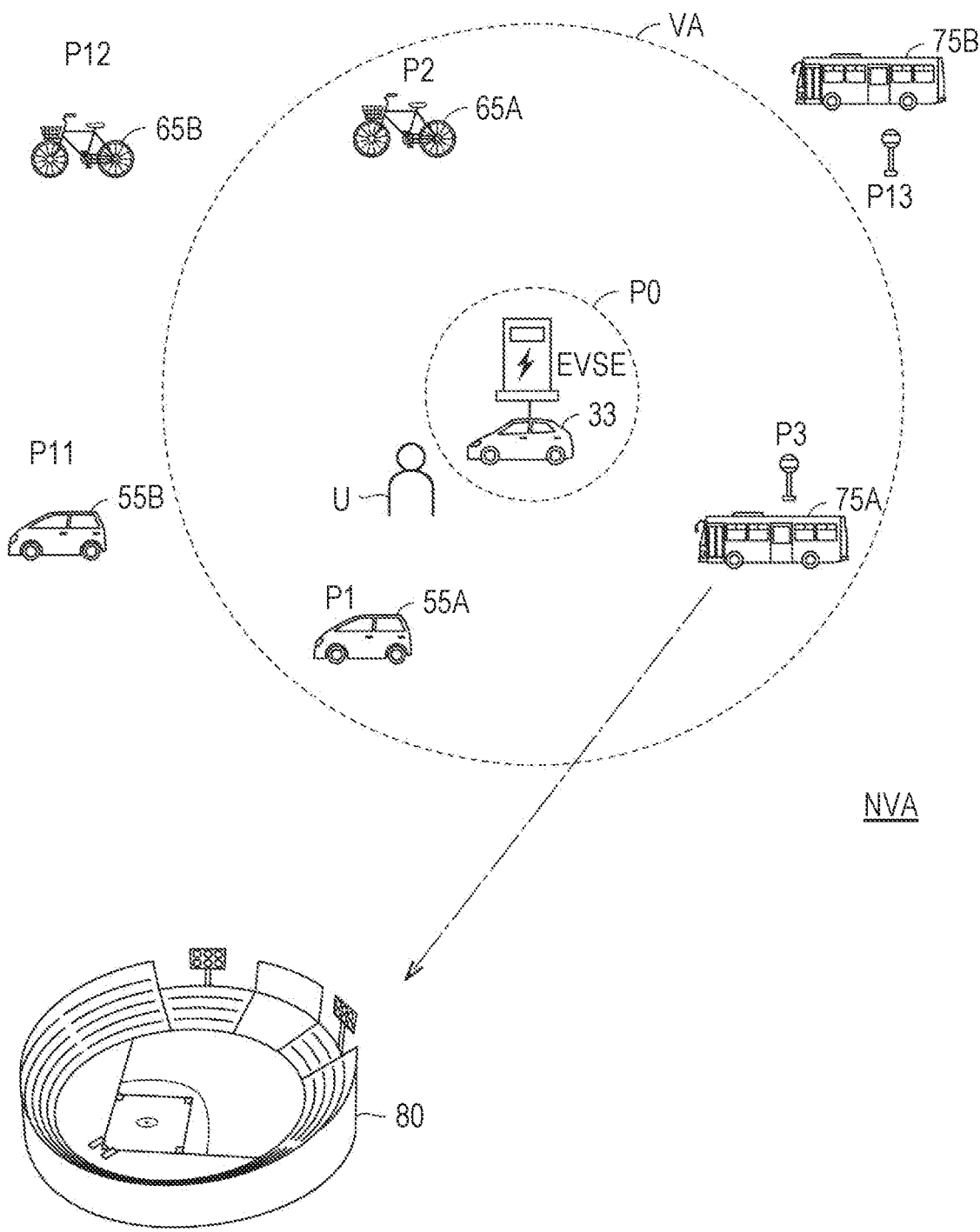
FIG. 2 is a diagram illustrating a positional relationship between a DR location of a vehicle and a use start location of a rented vehicle, a rented bicycle, and a bus.

FIG. 2 is a diagram illustrating a positional relationship between the DR location of the vehicle 33 and the use start locations of the rented vehicles 55, the rented bicycles 65, and the buses 75.

Referring to FIG. 2, the DR location of the vehicle 33 (an installation location of the electric power facility EVSE) is a location P0. The use start locations (locations of the parking lots) of the rented vehicles 55A and 55B are locations P1 and P11. The use start locations (locations of the parking lots) of the rented bicycles 65A and 65B are locations P2 and P12. The use start locations (locations of the bus stops) of the buses 75A and 75B are locations P3 and P13.

The locations P1 to P3 are located in a vicinity area VA of the location P0. The vicinity area VA is an area within a predetermined distance PD (for example, 1 km) from the location P0 in this example. On the other hand, the locations P11 to P13 are located in a non-vicinity area NVA which is an area other than the vicinity area VA. A baseball park 80 which is an example of an event facility is located in the non-vicinity area NVA. In this example, the baseball park 80 is a destination of the bus 75.

FIG. 3 is a diagram illustrating the detailed configuration of the vehicle 33. Referring to FIG. 3, the vehicle 33 includes an inlet 110, a power converter 120, a sensor unit 135, an HMI device 140, and a communication device 150 in addition to the power storage device 34. The vehicle 33 further includes a camera 155, an autonomous driving system 160, a non-contact thermometer 170, a wiper 175, a storage device 177, and an electronic control unit (ECU) 180.

A power cable CC extending from the electric power facility EVSE and a connector CN thereof are connected to the inlet 110. The inlet 110 receives electric power from the electric power facility EVSE via the power cable CC and the connector CN. The inlet 110 receives an input of a cable connection signal indicating whether the inlet 110 is connected to the connector CN from the connector CN.

The power converter 120 converts electric power received by the inlet 110 to DC electric power with a voltage level of the power storage device 34. The sensor unit 135 detects a value of charging electric power of the power storage device 34 while the vehicle 33 is performing external charging.

The HMI device 140 is, for example, a touch screen and includes an input device 142 and a display device 144. The input device 142 receives an input of various operations by a user U. The display device 144 displays various screens. A specific example of the screens displayed by the display device 144 will be described later in detail.

The communication device 150 is configured to communicate with a device (for example, the server 21) outside of the vehicle 33. For example, the communication device 150 is configured to receive an autonomous driving request AR from the server 21. When the inlet 110 is connected to the connector CN, the communication device 150 may be configured to communicate with the electric power facility EVSE by controller area network (CAN) communication.

The camera 155 generates a user image indicating a user by imaging the user U when the user U is in the vehicle 33.

The autonomous driving system 160 includes various sensors for enabling autonomous driving of the vehicle 33. The various sensors detect outside conditions of the vehicle 33 and whether there is an occupant in the vehicle 33 and various operations on the vehicle 33 by a user U. The autonomous driving system 160 performs various types of control (such as lane keeping control, cruising control, and stopping control) for enabling autonomous driving of the vehicle 33 on the basis of results of detection from the various sensors in cooperation with the ECU 180 (which will be described later).

The non-contact thermometer 170 detects a body temperature which is an example of biological information of the user U in the vehicle 33 in a non-contact manner. The non-contact thermometer 170 is an example of a "detection device" in the claims. The non-contact thermometer 170 may be replaced with a contact thermometer. The non-contact thermometer 170 may be replaced with a detection device that detects other biological information such as a pulse rate and a blood pressure of the user U in the vehicle 33.

The wiper 175 is used to wipe out a front windshield (not illustrated) of the vehicle 33 when it rains.

The storage device 177 stores various types of data of the vehicle 33. The various types of data include information indicating an operating state of the wiper 175 (wiper state information) at the current time.

The ECU 180 controls various devices of the vehicle 33. The ECU 180 causes, for example, the display device 144 to display various screens or causes the wiper 175 to operate when it rains.

The ECU 180 acquires a user image from the camera 155, acquires information indicating a detection value from the sensor unit 135, or acquires body temperature information indicating the body temperature of the user U from the non-contact thermometer 170. The ECU 180 may be configured to transmit the acquired information to the server 21 via the communication device 150.

The ECU 180 controls external charging of the vehicle 33. When a DR period comes in a state in which the power cable CC and the connector CN are connected to the inlet 110, the ECU 180 outputs a charging start request to the electric power facility EVSE by CAN communication. Accordingly, external charging is started. The ECU 180 determines whether an amount of charging electric power of the power storage device 34 under external charging (an amount of electric power supplied from the electric power facility EVSE to the power storage device 34 under external charging) has reached the allocated electric power based on the detection value from the sensor unit 135. When the amount of charging electric power has reached the allocated electric power, the ECU 180 outputs a charging end request to the electric power facility EVSE by CAN communication. Accordingly, the external charging is ended. As a result, participation of the vehicle 33 in the DR ends.

FIG. 4 is a diagram illustrating the database 52 stored in the provider server 50.

Referring to FIG. 4, the database 52 includes mobile object information 520 of the rented vehicles 55, the rented bicycles 65, and the buses 75. The mobile object information 520 includes identification (ID) 521, type information 522, occupant number information 523, operation requirement information 524, roofed/unroofed information 525, return requirement information 526, available period information 527, and use start location information 528.

The ID information 521 indicates identification information of a corresponding managed mobile object. In this example, the ID information 521 is correlated with a rented vehicle 55, a rented bicycle 65, or a bus 75.

The type information 522 indicates a type of a corresponding managed mobile object. In this example, the type information 522 indicates into which of a rented vehicle 55, a rented bicycle 65, and a bus 75 the corresponding managed mobile object is classified.

The occupant number information 523 indicates whether the number of occupants who can be in a corresponding managed mobile object is two or more, that is, into which of a mobile object for one person and a mobile object for two or more persons the corresponding managed mobile object is classified. In this example, a rented vehicle 55 and a bus 75 are classified into a mobile object for two or more persons. On the other hand, a rented bicycle 65 is classified into a mobile object for one person.

The operation requirement information 524 indicates which of an operation-required mobile object and an operation-unrequired mobile object a corresponding managed mobile object is. The operation-required mobile object is a mobile object requiring a user's operation for movement thereof. The operation-unrequired mobile object is a mobile object not requiring a user's operation for movement thereof. In this example, the rented vehicles 55 and the buses 75 are classified as operation-unrequired mobile objects. On the other hand, the rented bicycle 65 is classified as an operation-required mobile object.

The roofed/unroofed information 525 indicates which of a roofed mobile object and an unroofed mobile object a corresponding managed mobile object is. In this way, managed mobile objects are classified into a roofed mobile object and an unroofed mobile object. In this example, the rented vehicles 55A and 55B and the buses 75 are classified as roofed mobile objects. On the other hand, the rented vehicle 55C (open vehicles) and the rented bicycle 65 are classified as unroofed mobile objects.

The return requirement information 526 indicates into which of a return-required mobile object and a return-unrequired mobile object a corresponding managed mobile object is classified. The return-required mobile object is a mobile object which is determined in advance as a mobile object requiring return to a use start location thereof. The return-unrequired mobile object is a mobile object other than the return-required mobile object (that is, a mobile object which is determined in advance as a mobile object not requiring return to a use start location thereof). In this example, the rented vehicle 55 and the rented bicycle 65 are classified as return-required mobile objects. On the other hand, the bus 75 is classified as a return-unrequired mobile object.

The available period information 527 indicates an available period of a corresponding mobile object. The use start location information 528 indicates a use start location of a corresponding managed mobile object.

The vehicle 33 is connected to the electric power facility EVSE via the charging cable CC and the connector CN in the DR period. Accordingly, the user U cannot move from the DR location with driving of the vehicle 33 in the DR period. As a result, there is a likelihood that convenience for the user U's movement will decrease.

The server 21 according to the embodiment has a configuration for coping with this problem. Specifically, the processing device 26 performs a process of inquiring the provider server 50 about whether the mobile object group 53 includes a managed mobile object satisfying a predetermined use condition via the communication device 24.

The use condition is a condition that an available period of the managed mobile object is in the DR period and the use start location thereof is located in the vicinity area VA of the DR location. The managed mobile object satisfying this use condition is also referred to as a "target mobile object." For example, the rented vehicle 55A (FIG. 2) is located in the vicinity area VA and thus may be a target mobile object. On the other hand, the rented vehicle 55B is located in the non-vicinity area NVA and thus may not be a target mobile object. The target mobile object can be used as an alternative mobile object of the vehicle 33 in the DR period by the user U. The number of target mobile objects may be two or more. The rented vehicles 55, the rented bicycles 65, and the buses 75 which are target mobile objects are also referred to as target rented vehicles, target rented bicycles, and target buses.

In response to the inquiry, the provider server 50 determines whether the mobile object group 53 includes a target mobile object. Specifically, the provider server 50 acquires the DR location information 23 and the DR period information 25 of the vehicle 33 from the server 21 and performs the determination process based on the result of acquisition, the available period information 527, and the use start location information 528 (FIG. 4). When the mobile object group 53 includes a target mobile object, the provider server 50 notifies the server 21 of that gist.

Then, the processing device 26 performs a notification process of notifying the user U of target mobile object information indicating an available period and a use start location of the target mobile object. The target mobile object information corresponds to the available period information 527 and the use start location information 528 of the target mobile object and may further include the ID information 521, the type information 522, the occupant number information 523, the operation requirement information 524, the roofed/unroofed information 525, and the return requirement information 526 of the target mobile object.

When the notification process is performed as described above, it is possible to motivate the user U to use the target mobile object instead of the vehicle 33 in the DR period. Accordingly, the user U can move efficiently using the target mobile object even in the DR period in which the vehicle 33 cannot be operated for driving.

Figure 5:
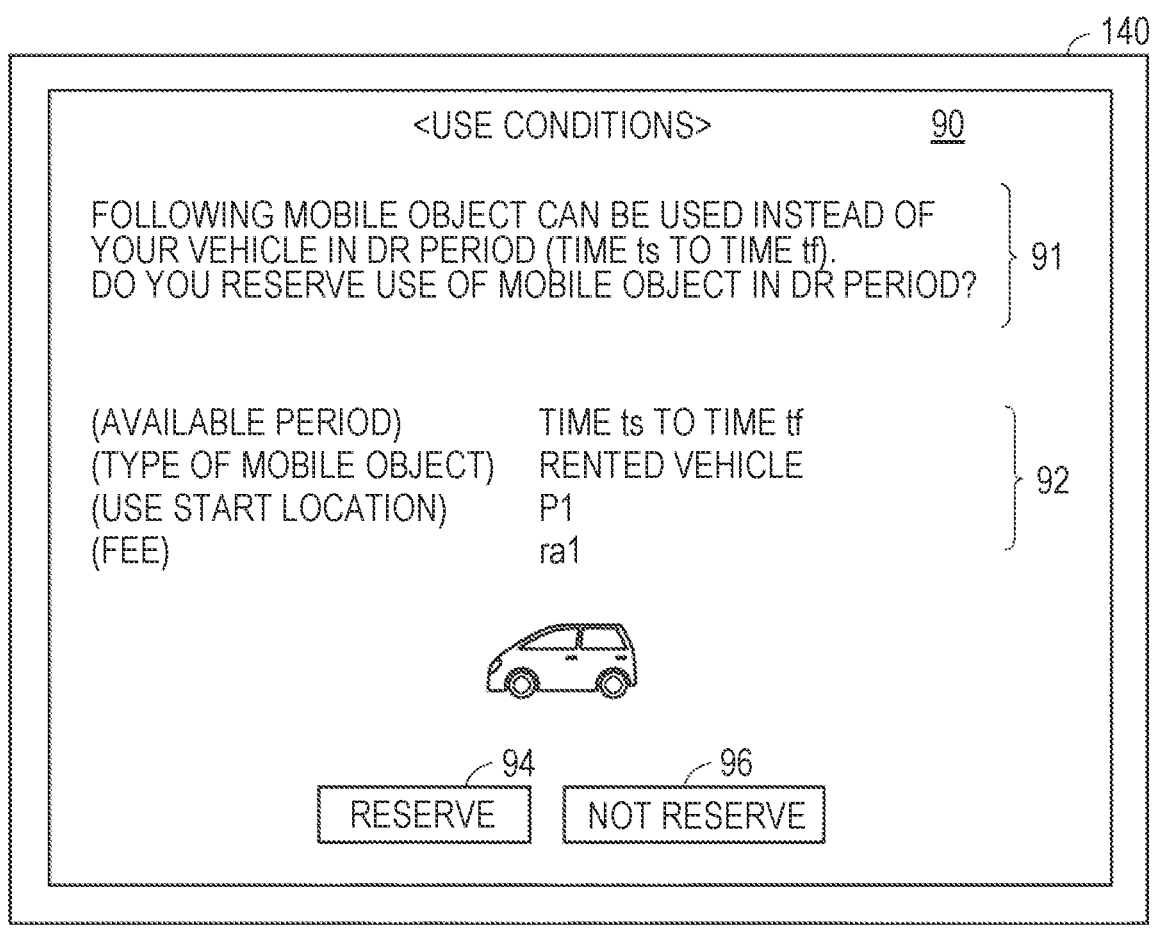
FIG. 5 is a diagram illustrating an example of a screen which is displayed on an HMI device when a user is notified of target mobile object information.

FIG. 5 is a diagram illustrating an example of a screen that is displayed on the HMI device 140 when a user U is notified of target mobile object information. In this example, one target mobile object is illustrated and the target mobile object is the rented vehicle 55, but may be another mobile object such as a rented bicycle 65 or a bus 75.

Referring to FIG. 5, a screen 90 includes messages 91 and 92 and buttons 94 and 96. The message 91 represents that a rented vehicle 55 is available instead of the vehicle 33 in the DR period of the vehicle 33 (time ts to time tf in this example). The message 91 inquires the user U about whether use of the rented vehicle 55 in the DR period is to be reserved.

The message 92 represents an available period, a type, a use start location (the position P1 in FIG. 2), and a usage fee of the target mobile object (the rented vehicle 55 in this example).

The button 94 is operated when the user U is to reserve use of the target mobile object in the DR period. When the button 94 is operated, a signal indicating that gist is transmitted from the vehicle 33 to the server 21. Thereafter, the server 21 transmits the signal to the provider server 50. Accordingly, reservation of the target mobile object is completed. As a result, the user U can use the target mobile object in the DR period. On the other hand, the button 95 is operated when the user U is not to reserve use of the target mobile object.

Figure 6:
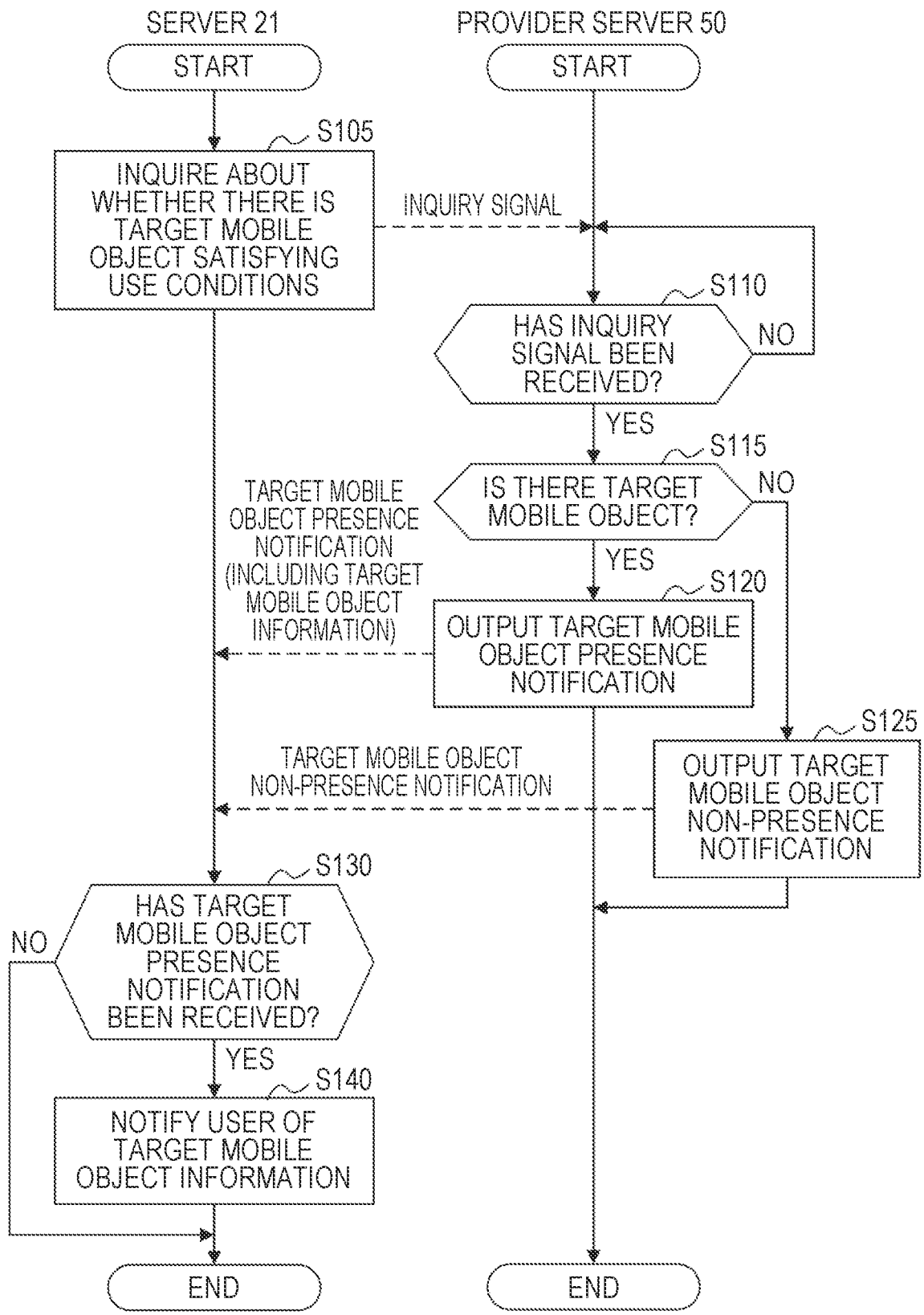
FIG. 6 is a flowchart illustrating an example of a routine which is performed by a processing device of a server according to the embodiment.

FIG. 6 is a flowchart illustrating an example of a routine which is performed by the processing device 26 of the server 21 according to this embodiment. The flowchart starts when the server 21 receives an approval signal AS (FIG. 1). In the following description, FIGS. 1 to 6 will be appropriately referred to.

Referring to FIG. 6, the server 21 transmits an inquiry signal for inquiring about whether a target mobile object satisfying the use condition is present to the provider server 50 (Step S105). The inquiry signal includes information indicating the DR location and the DR period of the vehicle 33 (the DR location information 23 and the DR period information 25 of the vehicle 33). Thereafter, the routine of the server 21 proceeds to Step S130.

The provider server 50 determines whether an inquiry signal has been received (Step S110). When an inquiry signal has not yet been received (NO in Step S110), the provider server 50 performs this determination process until the signal is received. On the other hand, when the provider server 50 has received the inquiry signal (YES in Step S110), the routine of the provider server 50 proceeds to Step S115.

The provider server 50 determines whether a target mobile object is present (that is, whether the mobile object group 53 includes a target mobile object). Specifically, the provider server 50 determines whether the available period indicated by the available period information 527 is in the DR period indicated by the inquiry signal and the use start location indicated by the use start location information 528 is in the vicinity area VA of the DR location indicated by the inquiry signal.

When a target mobile object is present (YES in Step S115), the provider server 50 outputs a target mobile object presence notification indicating that a target mobile object is present to the server 21 (Step S120). The target mobile object presence notification includes information including the available period information 527 and the use start location information 528 of the target mobile object (target mobile object information). The target mobile object presence notification further includes information indicating whether a plurality of target mobile objects is present and includes target mobile object information for each target mobile object when a plurality of target mobile objects is present.

On the other hand, when a target mobile object is not present (NO in Step S115), the provider server 50 outputs a target mobile object non-presence notification indicating that a target mobile object is not present to the server 21 (Step S125). After Step S120 or S125, the routine of the provider server 50 ends.

The server 21 switches the routine based on whether a target mobile object presence notification has been received from the provider server 50 (Step S130). When a target mobile object presence notification has been received (YES in Step S130), the server 21 notifies the user U of the target mobile object information (Step S140). The server 21 transmits a signal to the vehicle 33, for example, such that the screen 90 is displayed on the HMI device 140. After Step S140, the routine of the server 21 ends. On the other hand, when a target mobile object presence notification has not been received, that is, when a target mobile object non-presence notification has been received, (NO in Step S130), the server 21 ends the routine.

On the other hand, when a plurality of target mobile objects is present (when a plurality of mobile objects satisfies the aforementioned use condition), the server 21 may notify the user U of the target mobile object information for each target mobile object in Step S140. In this notification process, the server 21 may transmit a signal to the vehicle 33 such that a screen for allowing the user U to select and reserve one favorite target mobile object out of the target mobile objects is displayed on the HMI device 140.

Even when a plurality of target mobile objects is present, the server 21 may not notify the user U of the target mobile object information for each target mobile object. In this case, how the server 21 should select a mobile object of which target mobile object information is notified to the user U out of the target mobile objects will be also described later in Modified Examples 1 to 3.

According to this embodiment, it is possible to motivate the user U to use a target mobile object instead of the vehicle 33 in the DR period. As a result, it is possible to improve convenience for the user U's movement in the DR period while contributing to adjustment of electric power demand-supply balance in the power grid 40.

Modified Example 1

In Modified Example 1, when a plurality of target mobile objects is present, the server 21 performs a process of acquiring a result of detection by the non-contact thermometer 170 from the non-contact thermometer 170. Then, the server 21 selects a proposed mobile object that is proposed to the user U out of the plurality of target mobile objects based on the result of detection from the non-contact thermometer 170. When the number of target mobile objects is 1, the target mobile object is the same as the proposed mobile object.

For example, when the body temperature of the user U is equal to or higher than a reference temperature (for example, 37° C.), the server 21 selects a target mobile object which can be used by only the user U (such as a mobile object for one person such as the rented bicycle 65) as the proposed mobile object and notifies the user U of target mobile object information thereof.

For example, when the body temperature of the user U is lower than the reference temperature (for example, 37° C.), the server 21 selects a target mobile object which can be used along with another person by the user U (such as a mobile object for two or more persons such as the bus 75) as the proposed mobile object and notifies the user U of target mobile object information thereof. When the body temperature is lower than the reference temperature, the server 21 may select a mobile object for one person as the proposed mobile object.

When the non-contact thermometer 170 is replaced with a detection device that detects other biological information such as a pulse rate and a blood pressure of the user U, the server 21 may determine whether a physical condition of the user U is good or bad based on the result of detection from the detection device and select the proposed mobile object based on the result of detection.

Figure 7:
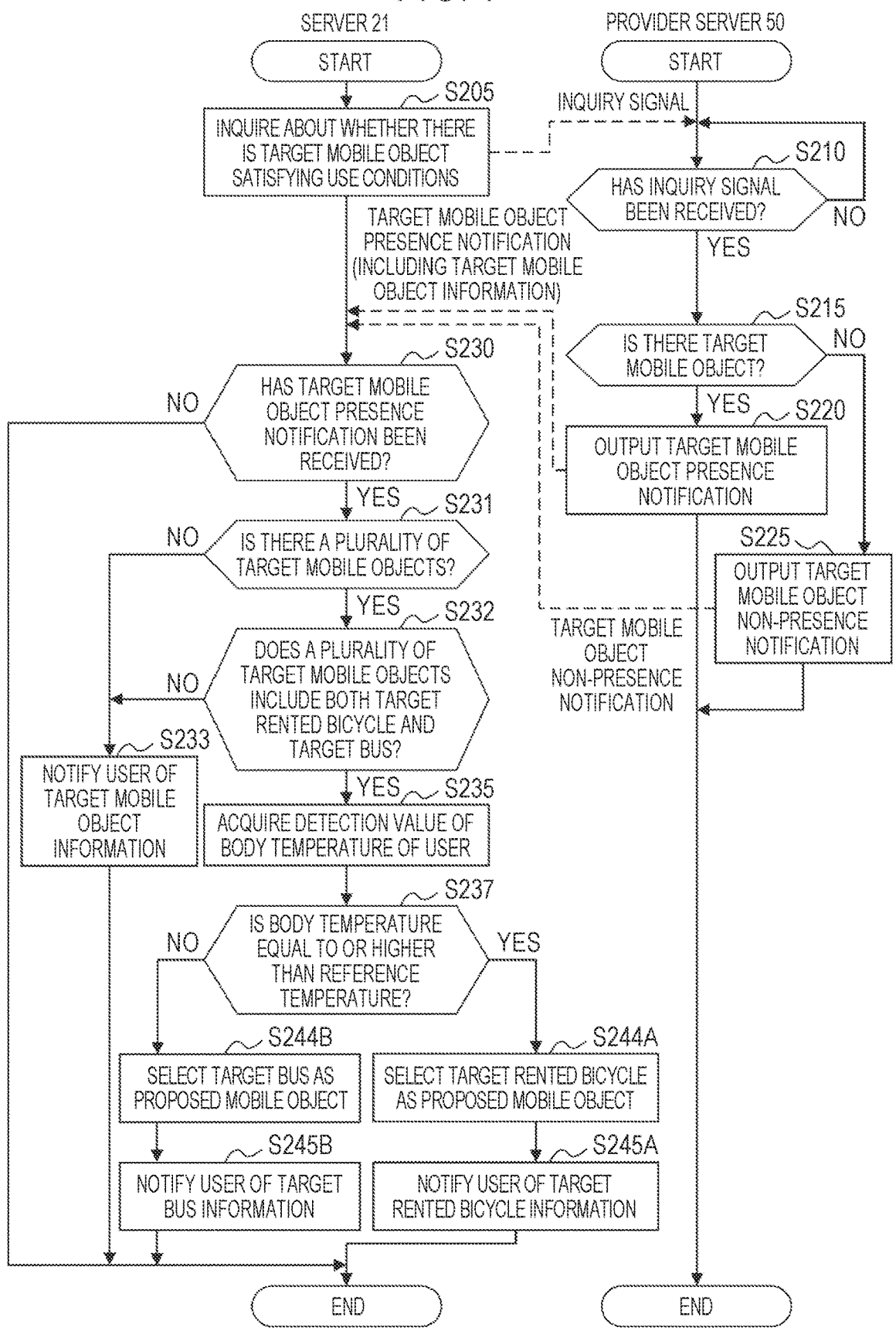
FIG. 7 is a flowchart illustrating an example of a routine which is performed by a processing device of a server according to Modified Example 1.

FIG. 7 is a flowchart illustrating an example of a routine which is performed by the processing device 26 of the server 21 according to Modified Example 1. This flowchart starts when the server 21 receives an approval signal AS. In this example, it is assumed that target mobile object information included in a target mobile object presence notification includes the type information 522 and the occupant number information 523 of the target mobile object.

Referring to FIG. 7, the flowchart is different from the flowchart according to the embodiment (FIG. 6) in that Steps S231 to S245B are added. Steps S205 to S230 are the same as Steps S105 to S130. In this example, a rented bicycle 65 is used as an example of a mobile object for one person and a bus 75 is used as an example of a mobile object for two or more persons.

When a target mobile object presence notification has been received (YES in Step S230), the server 21 switches the routine based on whether a plurality of target mobile objects is present (Step S231).

When a plurality of target mobile objects is not present, that is, when a single target mobile object is present, (NO in Step S231), the server 21 notifies the user U of the target mobile object information (Step S233) and then ends the routine. On the other hand, when a plurality of target mobile objects is present (YES in Step S231), the routine proceeds to Step S232.

The server 21 determines whether the plurality of target mobile objects includes both a target rented bicycle (a mobile object for one person) and a target bus (a mobile object for two or more persons) based on the type information 522 of the target mobile object information (Step S232). When the plurality of target mobile objects does not include both the mobile objects (NO in Step S232), the routine proceeds to Step S233. On the other hand, when the plurality of target mobile objects includes both the mobile objects (YES in Step S232), the routine proceeds to Step S235.

The server 21 acquires a detection value of the non-contact thermometer 170 (a detection value of the body temperature of the user U) from the vehicle 33 (Step S235), determines whether the body temperature of the user U is equal to or higher than a reference temperature (Step S237), and switches the routine based on the occupant number information 523.

Specifically, when the body temperature is equal to or higher than the reference temperature (YES in Step S237), the server 21 selects a target rented bicycle which is a mobile object for one person as the proposed mobile object (Step S244A) and notifies the user U of target mobile object information of the target rented bicycle (Step S245A). On the other hand, when the body temperature is lower than the reference temperature (NO in Step S237), the server 21 selects a target bus which is a mobile object for two or more persons as the proposed mobile object (Step S244B) and notifies the user U of target mobile object information of the target bus (Step S245B). After step S245A or Step S245B, the routine of the server 21 ends.

According to Modified Example 1, the proposed mobile object is selected based on biological information such as the body temperature of the user U. Accordingly, it is possible to propose a target mobile object suitable for the physical condition of the user U to the user U. As a result, it is possible to motivate the user U to use the suitable target mobile object instead of the vehicle 33.

Modified Example 2

In Modified Example 2, the server 21 performs an attribute determining process of determining (estimating) attributes of the user U based on a user image from the camera 155 when a plurality of target mobile objects is present. The attributes is, for example, age or sex of the user U. The attribute determining process is performed using a known image recognition technique or a known age estimation technique.

The server 21 selects the proposed mobile object which is proposed to the user U out of the plurality of target mobile objects based on the result of the attribute determining process. This will be described below in detail.

Figure 8:
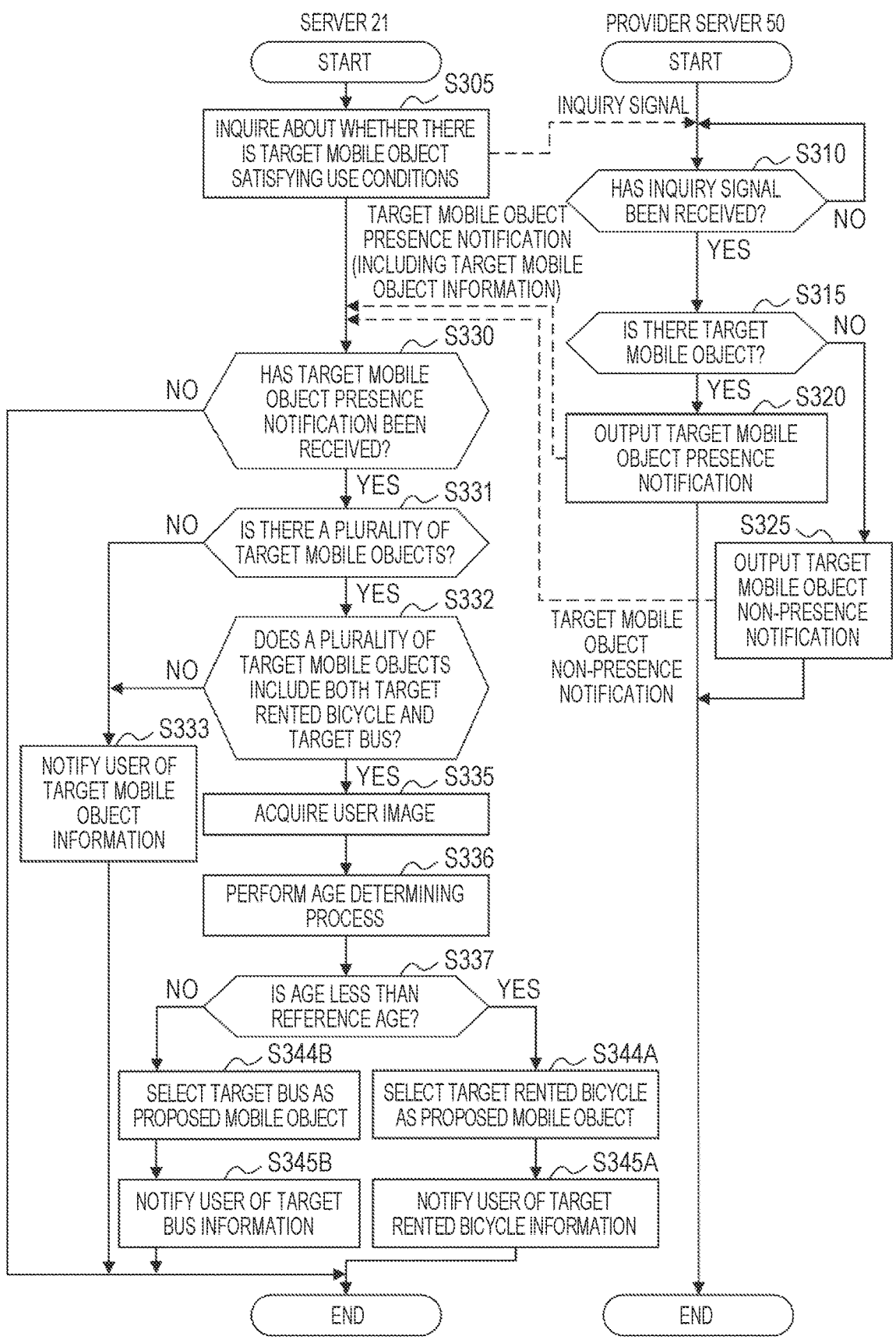
FIG. 8 is a flowchart illustrating an example of a routine which is performed by a processing device of a server according to Modified Example 2.

FIG. 8 is a flowchart illustrating an example of a routine which is performed by the processing device 26 of the server 21 according to Modified Example 2. This flowchart starts when the server 21 receives an approval signal AS. In this example, it is assumed that target mobile object information included in a target mobile object presence notification includes the type information 522 and the operation requirement information 524 of a target mobile object.

Referring to FIG. 8, the flowchart is different from the flowchart according to Modified Example 1 (FIG. 7) in that the processes of Steps S335 to S345B are performed instead of the processes of Steps S235 to S245B. Steps S305 to S333 are the same as Steps S205 to S233. In this example, a rented bicycle 65 is used as an example of an operation-required mobile object and a bus 75 is used as an example of an operation-unrequired mobile object.

When a plurality of target mobile objects includes both a target rented bicycle and a target bus (YES in Step S332), the server 21 acquires a user image UI from the vehicle 33 (Step S335). Subsequently, the server 21 performs an age determining process of determining age of the user U based on the user image UI (Step S336).

The server 21 determines whether the age of the user U is less than a reference age (for example, 50 years) (Step S337). When the age of the user U is less than the reference age (YES in Step S337), the server 21 performs a process of selecting the target rented bicycle as the proposed mobile object (Step S344A) and notifies the user U of the target mobile object information of the target rented bicycle (Step S345A). On the other hand, when the age of the user U is equal to or greater than the reference age (NO in Step S337), the server 21 performs a process of selecting the target bus as the proposed mobile object (S344B) and notifies the user U of the target mobile object information of the target bus (Step S345B).

According to Modified Example 2, the proposed mobile object is selected based on the attributes of the user U. Accordingly, it is possible to propose a target mobile object suitable for the attributes of the user U to the user U. As a result, it is possible to motivate the user U to use the suitable target mobile object instead of the vehicle 33.

Modified Example 3

When a plurality of target mobile objects is present, the server 21 may determine whether a predetermined bad weather prediction condition indicating bad weather in the DR period is satisfied. When the bad weather prediction condition is satisfied, the server 21 performs the notification process by notifying the user U of target mobile object information of a roofed mobile object (for example, the rented vehicles 55A and 55B or the bus 75) out of the plurality of target mobile objects. Accordingly, it is possible to protect the user U from inconvenience due to bad weather in the DR period.

The bad weather prediction condition is, for example, that the wiper 175 is operating at the current time. When the wiper 175 is operating at the current time, there is a likelihood of bad weather in the DR period. This determination of whether the bad weather prediction condition is satisfied/not satisfied according to the operating state of the wiper 175 is effective when the current time is close to a start time of the DR period (for example, when the contract is performed immediately before the start time). Alternatively, the bad weather prediction condition may be that bad weather in the DR period is predicted by weather forecast.

Figure 9:
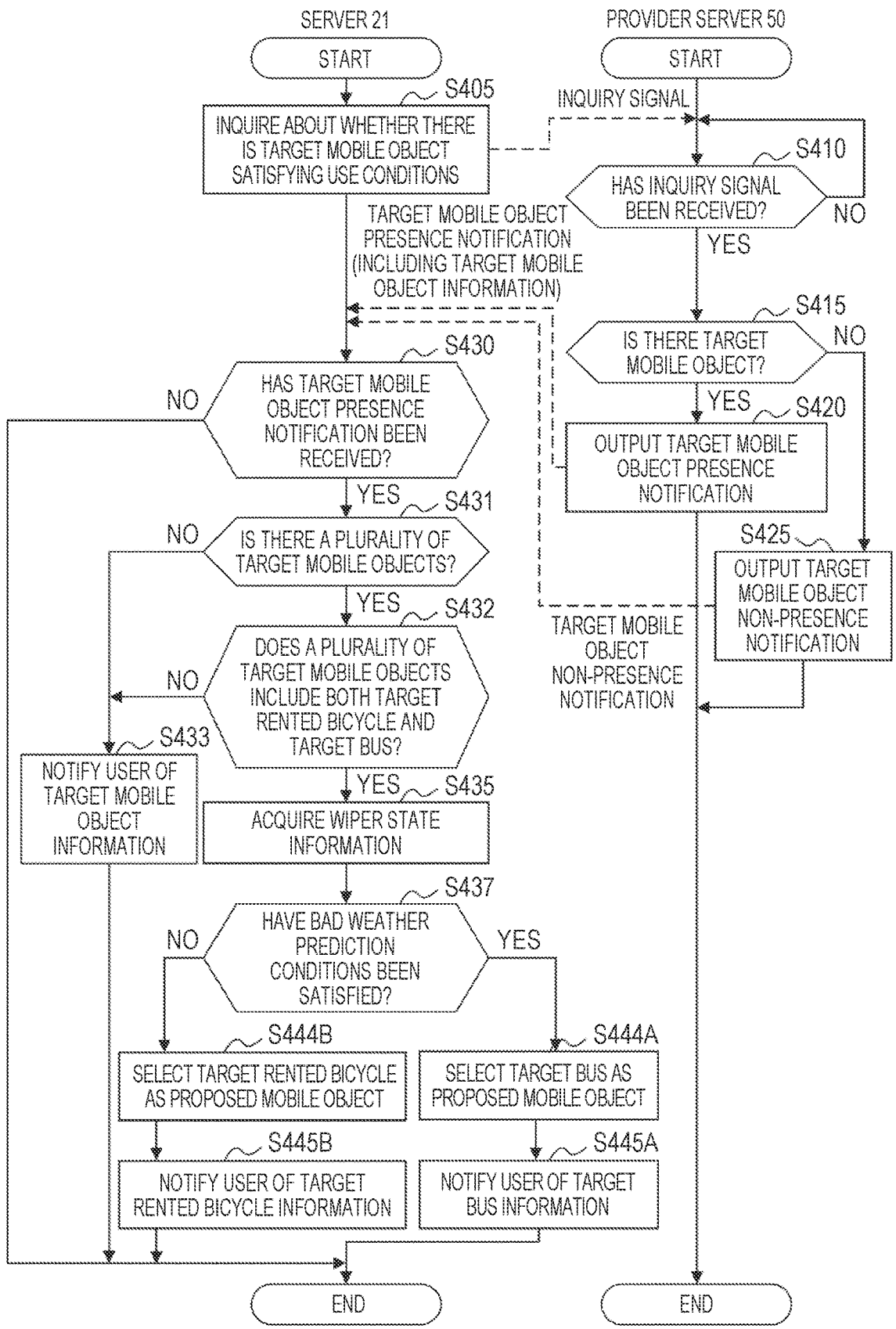
FIG. 9 is a flowchart illustrating an example of a routine which is performed by a processing device of a server according to Modified Example 3.

FIG. 9 is a flowchart illustrating an example of a routine which is performed by the processing device 26 of the server 21 according to Modified Example 3. This flowchart starts when the server 21 receives an approval signal AS. In this example, it is assumed that target mobile object information included in a target mobile object presence notification includes the type information 522 and the roofed/unroofed information 525 of the target mobile object.

Referring to FIG. 9, the flowchart is different from the flowchart according to Modified Example 1 (FIG. 7) in that the processes of Steps S435 to S445B are performed instead of the processes of Steps S235 to S245B. Steps S405 to S433 are the same as Steps S205 to S233. In this example, a rented bicycle 65 is used as an example of an unroofed mobile object and a bus 75 is used as an example of a roofed mobile object.

When a plurality of target mobile objects includes both a target rented bicycle and a target bus (YES in Step S432), the server 21 acquires wiper state information indicating the operating state of the wiper from the vehicle 33 (Step S435). Subsequently, the server 21 determines whether the bad weather prediction condition is satisfied (whether the wiper is operating in this example) based on the wiper state information (Step S437).

When the bad weather prediction condition is satisfied (YES in Step S437), the server 21 performs a process of selecting the target bus as the proposed mobile object (Step S444A) and notifies the user U of the target mobile object information of the target bus (Step S445A).

On the other hand, when the bad weather prediction condition is not satisfied (NO in Step S437), the server 21 performs a process of selecting the target rented bicycle (an unroofed mobile object) as the proposed mobile object (S444B) and notifies the user U of the target mobile object information of the target rented bicycle (Step S445B).

According to Modified Example 3, when the weather in the DR period is bad, it is possible to motivate the user U to use the roofed mobile object instead of the vehicle 33. Accordingly, the user U can efficiently moves while avoiding inconvenience due to the bad weather in the DR period.

Modified Example 4

In Modified Example 4, the server 21 determines whether an early return condition is satisfied after the user U has started from the use start location using a target mobile object. The early return condition is a predetermined condition that the user U returns to the DR location earlier than a scheduled end time of the DR period. For example, the early return condition is that the user U enters a vicinity area VA from a non-vicinity area NVA at a time (a prior time) earlier by a predetermined time (for example, 1 hour) than the scheduled end time. The server 21 acquires position information of the user U from the mobile terminal 38 and determines whether the user U has entered the vicinity area VA based on the position information.

When the early return condition is satisfied, the server 21 performs a process of increasing the command value CV of charging electric power of the power storage device 34 in the DR period. Then, the server 21 transmits the increased command value CV to the electric power facility EVSE.

With this configuration, when it is considered that the user returns to the DR location earlier than the scheduled end time of the DR period, the charging electric power of the power storage device 34 (electric power supplied from the electric power facility EVSE to the power storage device 34) increases. Accordingly, the amount of charging electric power in the power storage device 34 in the DR period reaches the allocated electric power earlier than that when the command value CV is not increased. As a result, external charging of the vehicle 33 ends earlier than the original scheduled end time of the DR period. That is, participation of the vehicle 33 in the DR ends early. As a result, the user U can restart driving of the vehicle 33 immediately when the user returns to the DR location earlier than the original scheduled end time of the DR period.

A destination of the user U moving in the DR period may be notified to the server 21 in advance, and the early return condition may be determined according to the destination. For example, when the destination is a baseball park 80 (FIG. 2), the early return condition may be that the baseball game in the baseball park 80 ends earlier by a predetermined time than a reference time (for example, a time later by 3 hours from a baseball game start time). When the baseball game ends early in this way, it is considered that the user U returns early to the DR location (the location P0) from the baseball park 80. The server 21 can acquire information indicating that the baseball game ends early in this way from an external server (for example, a server that provides sports news for reporting the result of the baseball game in the baseball park 80).

Figure 10:
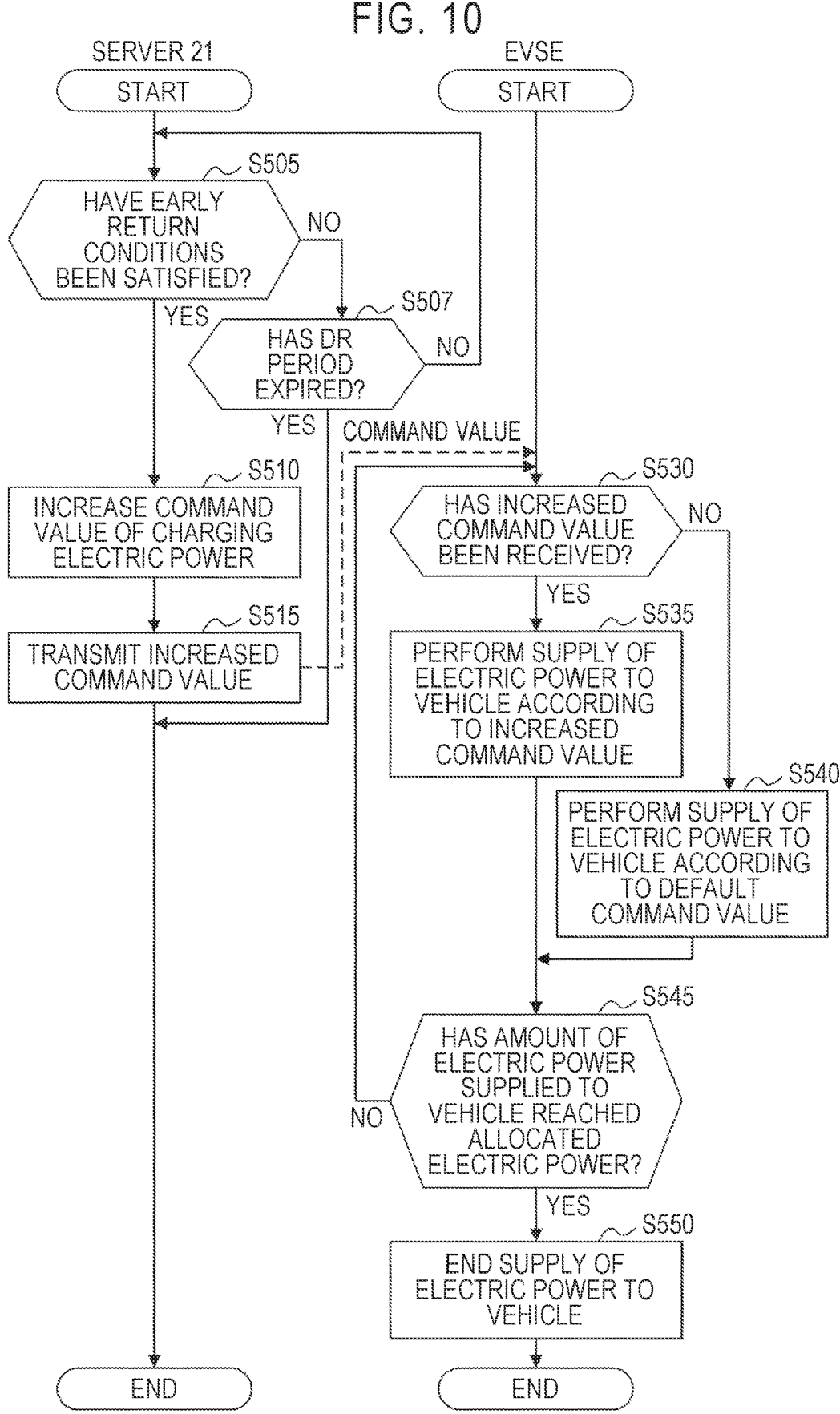
FIG. 10 is a flowchart illustrating an example of a routine which is performed by a processing device of a server according to Modified Example 4.

FIG. 10 is a flowchart illustrating an example of a routine which is performed by the processing device 26 of the server 21 according to Modified Example 4. This flowchart starts when the server 21 receives a signal indicating that the user U uses a target mobile object and has started from the use start location of the target mobile object (for example, location P1, P2, or P3) from the provider server 50.

When the flowchart starts, it is assumed that the DR period has started already (the electric power facility EVSE has started supply of electric power to the vehicle 33) and the command value CV of charging electric power in the power storage device 34 is a predetermined default value. It is also assumed that the default value is a value obtained by dividing the allocated electric power of the vehicle 33 by the length of the DR period.

Referring to FIG. 10, the server 21 determines whether the early return condition has been satisfied (Step S505). When the early return condition has been satisfied (YES in Step S505), the routine proceeds to Step S510. On the other hand, when the early return condition has not been satisfied (NO in Step S505), the routine proceeds to Step S507.

The server 21 determines whether the DR period has ended based on the DR period information 25 (Step S507). When the DR period has not yet ended (NO in Step S507), the routine returns to Step S505. On the other hand, when the DR period has ended (YES in Step S507), the server 21 ends the routine.

When the early return condition has been satisfied (YES in Step S505), the server 21 increases the command value CV of charging electric power in the power storage device 34 from the default value (Step S510) and transmits the increased command value CV to the electric power facility EVSE (Step S515). Thereafter, the routine of the server 21 ends.

The electric power facility EVSE switches the routine based on whether the increased command value CV has been received (Step S530).

When the increased command value CV has been received (YES in Step S530), the electric power facility EVSE performs supply of electric power to the vehicle 33 in accordance with the increased command value CV (Step S535).

On the other hand, when the increased command value CV has not been received (NO in Step S530), the electric power facility EVSE performs supply of electric power to the vehicle 33 in accordance with the default command value CV (Step S540). After Step S535 or Step S540, the routine proceeds to Step S545.

The electric power facility EVSE determines whether an amount of electric power supplied to the vehicle 33 in the DR period has reached the allocated electric power of the vehicle 33 (Step S545). In this example, the electric power facility EVSE performs this determination process based on whether the charging end request has been acquired from the vehicle 33 by CAN communication.

When the amount of supplied electric power has not yet reached the allocation electric power (NO in Step S545), the electric power facility EVSE returns the routine to Step S530. On the other hand, when the amount of supplied electric power has reached the allocation electric power (YES in Step S545), the electric power facility EVSE ends supply of electric power to the vehicle 33 (Step S550).

According to Modified Example 4, charging electric power of the power storage device 34 is increased when the early return condition has been satisfied. Accordingly, the amount of electric power supplied from the electric power facility EVSE to the vehicle 33 reaches the allocated electric power earlier than when the early return condition has not been satisfied. As a result, participation of the vehicle 33 in the DR ends earlier. Accordingly, the user U can avoid a situation in which the user unnecessarily waits up to the original scheduled end time after having returned early to the DR location.

Modified Example 5

When the target mobile object used by the user U is a return-unrequired mobile object (for example, the bus 75), the server 21 may perform a process of generating an autonomous driving request AR such that the vehicle 33 moves to the location of the user U through autonomous driving after the DR period ends. Specifically, the server 21 acquires the position information of the user U from the mobile terminal 38 and generates the autonomous driving request AR for causing the vehicle 33 to move to the location indicated by the position information (that is, to move to meet the user U).

The user U does not need to return the use start location after having used the return-unrequired mobile object such as the bus 75. When the autonomous driving request AR is generated as described above, an autonomous driving command is transmitted to the vehicle 33 such that the vehicle 33 moves to the location of the user U through autonomous driving after the DR period has ended. Accordingly, the vehicle 33 moves to the location of the user U through autonomous driving after the DR period has ended. As a result, the user U can restart driving of the vehicle 33 after DR period has ended without returning to the DR location. For example, when the user U visited the baseball park 80 (FIG. 2) using the bus 75A as a target bus in the DR period, the user U can restart driving of the vehicle 33 without returning to the location P0.

FIG. 11 is a flowchart illustrating an example of a routine which is performed by the processing device 26 of the server 21 according to Modified Example 5. This flowchart starts when the DR period ends. In this example, it is assumed that the return requirement information 526 in the database 52 can be accessed by the server 21.

Referring to FIG. 11, the server 21 determines whether the target mobile object used by the user U is a return-unrequired mobile object (Step S605). The server 21 performs this determination process based on the return requirement information 526 for the target mobile object. When the target mobile object used by the user U is not a return-unrequired mobile object, that is, a return-required mobile object (No in Step S605), the routine of the server 21 ends. On the other hand, when the target mobile object is a return-unrequired mobile object (YES in Step S605), the routine proceeds to Step S607.

The server 21 acquires the position information of the user U based on the position information PI of the mobile terminal 38 (Step S607). Then, the server 21 generates an autonomous driving request AR such that the vehicle moves to the location of the user U through autonomous driving (Step S610) and transmits the generated autonomous driving request AR to the vehicle 33 (Step S615). Thereafter, the routine of the server 21 ends.

The vehicle 33 (more specifically, the ECU 180) determines whether an autonomous driving request AR has been received from the server 21 via the communication device 150 (Step S630). When an autonomous driving request AR has not yet been received (NO in Step S630), the ECU 180 performs this determination process until an autonomous driving request AR is received. On the other hand, when an autonomous driving request AR has been received (YES in Step S630), the ECU 180 causes the routine to proceed to Step S635.

The ECU 180 determines whether the vehicle 33 and the electric power facility EVSE has been disconnected (Step S635). Specifically, the ECU 180 determines whether connection between the power cable CC and the connector CN of the electric power facility EVSE and the inlet 110 has been cut off based on a level of the cable connection signal. When the connection has not yet been cut off (NO in Step S635), the ECU 180 performs the determination process until the connection is cut off. On the other hand, when the connection has been cut off (YES in Step S635), the ECU 180 starts autonomous driving of the vehicle 33 in cooperation with the autonomous driving system 160 (Step S640). Thereafter, the ECU 180 continues to perform autonomous driving of the vehicle 33 until the vehicle 33 reaches the location of the user U.

According to Modified Example 5, the user U can restart driving of the vehicle 33 after the DR period has ended without returning to the DR location. As a result, it is possible to improve convenience for the user U while contributing to adjustment of electric power demand-supply balance.

Other Modifications

The camera for generating the user image may be mounted in the mobile terminal 38. Then, the server 21 may acquire the user image generated by the camera from the mobile terminal 38, perform the attribute determining process based on the user image, and select a proposed mobile object.

Similarly, the detection device that detects biological information of a user such as a non-contact thermometer may be mounted in the mobile terminal 38. Then, the server 21 may acquire the biological information of the user from the mobile terminal 38 and select the proposed mobile object based on the result of acquisition.

The target mobile object is not limited to the rented vehicle 55, the rented bicycle 65, and the bus 75. For example, the target mobile object may be another type of mobile object such as a rented motorbike, a rented motorcycle, or an electric kickboard.

It should be understood that the aforementioned embodiment of the present disclosure is exemplary in all respects and is not restrictive. The scope of the present disclosure is defined by the appended claims, not by the above description and is intended to include all modifications within meanings and scopes equivalent to the claims.

What is claimed is:

1. A server configured to notify a user of a vehicle that is able to participate in demand response for adjusting electric power demand-supply balance in a power grid through external charging of charging an onboard power storage device using an electric power facility outside of the vehicle, the server comprising:
a storage device configured to store information indicating a demand response period which is a period in which the vehicle participates in the demand response and a demand response location which is a location of the electric power facility used for the vehicle to participate in the demand response;

a communication device configured to communicate with a provider server that stores information indicating an available period and a use start location of each of a plurality of managed mobile objects managed by a provider; and a processing device configured to:

perform a process of inquiring the provider server about whether the plurality of managed mobile objects includes a target mobile object of which the available period is in the demand response period and the use start location is in a vicinity area of the demand response location through the communication device;

obtain a position of the user from a mobile terminal having a global positioning system receiver configured to acquire and transmit position information of the mobile terminal of the user; and generate an autonomous driving request and transmit to the vehicle;

in response, the vehicle autonomously moves to the location of the user through autonomous driving after the demand response period ends permitting the user to restart driving of the vehicle after the demand response period ends without returning to the use start location, wherein, when the plurality of managed mobile objects includes the target mobile object, the processing device is configured to perform a notification process of notifying the user of target mobile object information indicating the available period and the use start location of the target mobile object.

2. The server according to claim 1, wherein the processing device is configured to perform a process of acquiring a result of detection of a detection device that detects biological information of the user from the detection device, and wherein, when a plurality of target mobile objects is present, the processing device is configured to:

acquire the result of detection of the detection device;

perform a process of selecting a proposed mobile object which is proposed to the user out of the plurality of target mobile objects based on the result of detection; and perform the notification process by notifying the user of the target mobile object information of the proposed mobile object.

3. The server according to claim 1, wherein the processing device is configured to perform a process of acquiring a user image generated by an imaging device that images the user from the imaging device and to perform an attribute determining process of determining attributes of the user based on the user image, and wherein, when a plurality of target mobile objects is present, the processing device is configured to perform a process of selecting a proposed mobile object which is proposed to the user out of the plurality of target mobile objects based on a result of the attribute determining process and to perform the notification process by notifying the user of the target mobile object information of the proposed mobile object.

4. The server according to claim 1, wherein the managed mobile objects are classified into a roofed mobile object and an unroofed mobile object, and wherein, when a predetermined condition indicating bad weather in the demand response period is satisfied, the processing device is configured to perform the notification process by notifying the user of the target mobile object information of the roofed mobile object out of the plurality of target mobile objects.

5. The server according to claim 1, wherein the processing device is configured to:

perform a process of setting a command value of charging electric power of the onboard power storage device in the demand response period; and perform a process of increasing the command value when a predetermined condition for returning to the demand response location earlier than a scheduled end time of the demand response period is satisfied after the user has started from the use start location using the target mobile object.

6. The server according to claim 1, wherein the vehicle is configured to perform autonomous driving, wherein the communication device is configured to transmit an autonomous driving request for requesting the autonomous driving of the vehicle to the vehicle, wherein the managed mobile objects are classified into a return-required mobile object which is predetermined as a mobile object requiring return to the use start location after the user has used the mobile object and a return-non-required mobile object other than the return-required mobile object, and wherein, when the target mobile object used by the user is the return-non-required mobile object, the processing device is configured to perform a process of generating the autonomous driving request such that the vehicle moves to a location of the user through the autonomous driving after the demand response period has expired.

7. A power conditioning system comprising:

a vehicle that is able to participate in demand response for adjusting electric power demand-supply balance in a power grid through external charging of charging an onboard power storage device using an electric power facility outside of the vehicle; and a server configured to notify a user of a vehicle, wherein the server includes:

a storage device configured to store information indicating a demand response period which is a period in which the vehicle participates in the demand response and a demand response location which is a location of the electric power facility used for the vehicle to participate in the demand response;

a communication device configured to communicate with a provider server that stores information indicating an available period and a use start location of each of a plurality of managed mobile objects managed by a provider; and a processing device configured to:

perform a process of inquiring the provider server about whether the plurality of managed mobile objects includes a target mobile object of which the available period is in the demand response period and the use start location is in a vicinity area of the demand response location through the communication device;

obtain a position of the user from a mobile terminal having a global positioning system receiver configured to acquire and transmit position information of the mobile terminal of the user; and generate an autonomous driving request and transmit to the vehicle;

in response, the vehicle autonomously moves to the location of the user through autonomous driving after the demand response period ends permitting the user to restart driving of the vehicle after the demand response period ends without returning to the use start location, wherein, when the plurality of managed mobile objects includes the target mobile object, the processing device is configured to perform a notification process of notifying the user of target mobile object information indicating the available period and the use start location of the target mobile object.

* * * * *